(12) United States Patent
Krishnan et al.

(10) Patent No.: US 9,582,561 B2
(45) Date of Patent: Feb. 28, 2017

(54) SIZE-BASED DATA SYNCHRONIZATION

(71) Applicant: SAP SE, Walldorf (DE)

(72) Inventors: Ramalingam Krishnan, Coimbatore (IN); Siva Satya Prasad Yerra, Visakhapatnam (IN)

(73) Assignee: SAP SE, Walldorf (DE)

( * ) Notice: Subject to any disclaimer, the term of this patent is extended or adjusted under 35 U.S.C. 154(b) by 390 days.

(21) Appl. No.: 13/942,754

(22) Filed: Jul. 16, 2013

(65) Prior Publication Data
US 2015/0026123 A1 Jan. 22, 2015

(51) Int. Cl.
*G06F 7/00* (2006.01)
*G06F 17/30* (2006.01)

(52) U.S. Cl.
CPC .. *G06F 17/30575* (2013.01); *G06F 17/30174* (2013.01)

(58) Field of Classification Search
CPC ......... G06F 17/30174; G06F 17/30575; G06F 17/30578
USPC ........................................ 707/610, 634, 620
See application file for complete search history.

(56) References Cited

U.S. PATENT DOCUMENTS

| | | | |
|---|---|---|---|
| 5,517,505 A | 5/1996 | Buchholz et al. | |
| 5,768,528 A * | 6/1998 | Stumm | 707/E17.116 |
| 7,103,886 B2 | 9/2006 | Haller et al. | |
| 7,177,865 B2 | 2/2007 | Sasaki et al. | |
| 7,650,609 B2 | 1/2010 | Klevenz et al. | |
| 7,657,609 B2 | 2/2010 | Klevenz et al. | |
| 8,065,341 B2 | 11/2011 | Kreibe et al. | |
| 8,316,129 B2 | 11/2012 | Kruse et al. | |
| 8,370,521 B2 | 2/2013 | Lamba et al. | |
| 8,429,351 B1 * | 4/2013 | Yu et al. | 711/132 |
| 8,458,218 B2 | 6/2013 | Wildermuth | |
| 8,572,213 B2 | 10/2013 | Sakata | |
| 8,605,605 B1 | 12/2013 | Vadlakonda et al. | |
| 2002/0194306 A1 * | 12/2002 | Tilt et al. | 709/219 |
| 2006/0184587 A1 * | 8/2006 | Federwisch et al. | 707/200 |
| 2007/0192403 A1 | 8/2007 | Heine et al. | |
| 2008/0089230 A1 | 4/2008 | Kootstra | |
| 2012/0143993 A1 | 6/2012 | Russo et al. | |
| 2013/0325921 A1 | 12/2013 | Seifert et al. | |

* cited by examiner

*Primary Examiner* — Ajith Jacob
(74) *Attorney, Agent, or Firm* — Jones Day

(57) ABSTRACT

Data synchronization techniques are provided that effectively isolate data transfer over the network from actual interpretation of data. The data synchronization techniques include a protocol designed to work based on a "size" (amount) of data transferred over the network, irrespective of the content represented by the data that is transferred. The size itself may be determined, for example, by the client, backend system, an agreed-upon configuration that is maintained for a predetermined period of time, etc. In certain embodiments, a client transmits a request to the server that indicates a "requested payload size." Using the requested payload size, the server generates a response (i.e., one or more messages) that provides the client with data, referred to herein as synchronization data, for storage at the client device.

15 Claims, 6 Drawing Sheets

SIZE-BASED DATA SYNCHRONIZATION

TECHNICAL FIELD

The present disclosure relates to a data synchronization protocol configured to operate based on a requested size (amount) of data to be transferred over a network.

BACKGROUND

A client is computer hardware or software that operates in conjunction with a backend system. In other words, as part of its operation, the client exchanges data with, or receives data from, the backend system via a network. A client may reside in, on, etc. any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), cable system or other set-top-box, an entertainment system component such as a television set, etc. A device that includes a client is referred to herein as a client device.

Certain clients may operate in an offline state (i.e., when the client device does not have an active network connection). As such, relevant data from backend systems is synchronized with the client such that, even in an offline state, the client can perform its intended operations. Conventionally, during data synchronization, messages (e.g., packets for related information) are sent one by one to the client. In the case of a large number of small messages, one network connection might be opened per message per user. In a typical mobile landscape with thousands of mobile users, a large number of connections create a load on the network that reduces the efficiency of the backend system and increase the overall bandwidth consumed and response time for the synchronization.

DESCRIPTION OF EXAMPLE EMBODIMENTS

Figure 1:
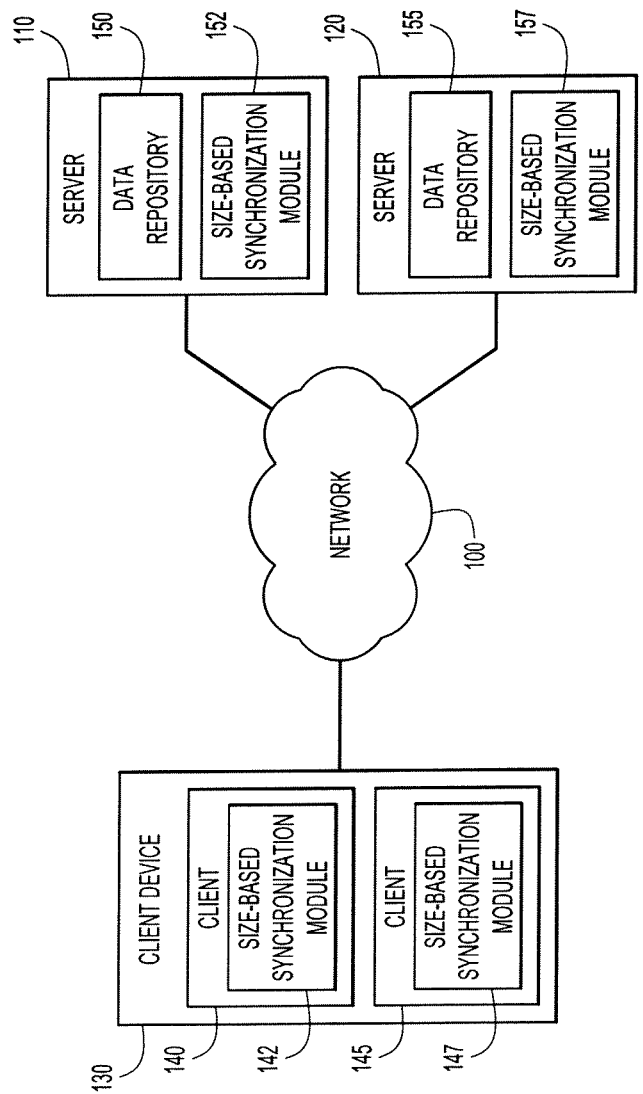
FIG. 1 shows an example network topology and entities that may perform data synchronization according to techniques described herein.

FIG. 1 shows an example network topology including entities that may implement the data synchronization techniques described herein. More specifically, FIG. 1 depicts a network 100 that enables data communications among multiple entities. The network 100 may be a private local area network (LAN) or a public wide area network (WAN), such as the Internet.

A backend system 110 and a backend system 120 are connected to the network 100. The backend systems 110 and 120 may comprise, for example, a desktop computer, laptop computer, server computer, etc. For ease of illustration, embodiments will be described herein with reference to the use of server computers (servers) as the backend systems 110 and 120.

Server 110 comprises a data repository 150 and a size-based synchronization module 152. Similarly, server 120 comprises a data repository 155 and a size-based synchronization module 157. The size-based synchronization modules 152 and 157 may be implemented in any combination of hardware and/or software and are configured to execute data synchronization operations described herein. The data repositories 150 and 155 may encompass, for example, any combination of one or more conventional Relational Database Management Systems (RDBMSs), Object Database Management Systems (ODBMS), in-memory Database Management Systems (DBMS), equivalent data storage and management facilities, etc.

In the example of FIG. 1, a client device 130 is wirelessly connected to the network 100. That is, client device 130 may communicate with other devices over the network 100 via wireless network services provided by a wireless telecommunications network (not shown), or may instead communicate using wireless fidelity (Wi-Fi) or other similar wireless communication techniques. While the instant embodiment is described with a wireless connection between network 100 and client device 130, those skilled in the art will appreciate that a wired connection is also possible.

In the embodiments of FIG. 1, the client device 130 comprises a first client 140 and a second client 145. The client 140 operates using data that is received from the data repository 150 at server 110, while client 150 operates using data that is received from the data repository 155 at server 120. The clients 140 and 145 comprise size-based synchronization modules 142 and 147. The size-based synchronization modules 142 and 147 may be implemented in any combination of hardware and/or software and are configured to execute data synchronization operations described herein.

In certain circumstances, clients 140 and 145 may operate "offline" (i.e., in a disconnected state) when the client device 130 does not have an active network connection with the servers 110 and 120. As such, the clients 140 and 145 are configured to locally store data from the data repositories 150 and 155, respectively, in the client device 130 for use while offline. To ensure proper offline operation, the locally stored data is synchronized with the data in the data repositories when an active network connection is available. However, since the available network time may be limited, it is important that the total time consumed on the network for data synchronization is minimized. This mandates that data synchronization is performed with a high degree of network efficiency, error resilience, and in a manner that is compatible with multiple data formats.

Presented herein are data synchronization techniques that effectively isolate data transfer over the network from actual interpretation of data. The data synchronization techniques include a protocol designed to work based on a "size" (amount) of data transferred over the network, irrespective of the content represented by the data that is transferred. The size itself may be determined, for example, by the client, backend system, an agreed-upon configuration that is maintained for a predetermined period of time, etc. In certain embodiments, a client transmits a request to the server that indicates a "requested payload size." Using the requested payload size, the server generates a response (i.e., one or more messages) that provides the client with data, referred to herein as synchronization data, for storage at the client device. In general, this approach substantially reduces or eliminates the need for any optimization that is based on the size of respective data objects stored in the server (e.g., data objects that are several MB in size).

Figure 2:
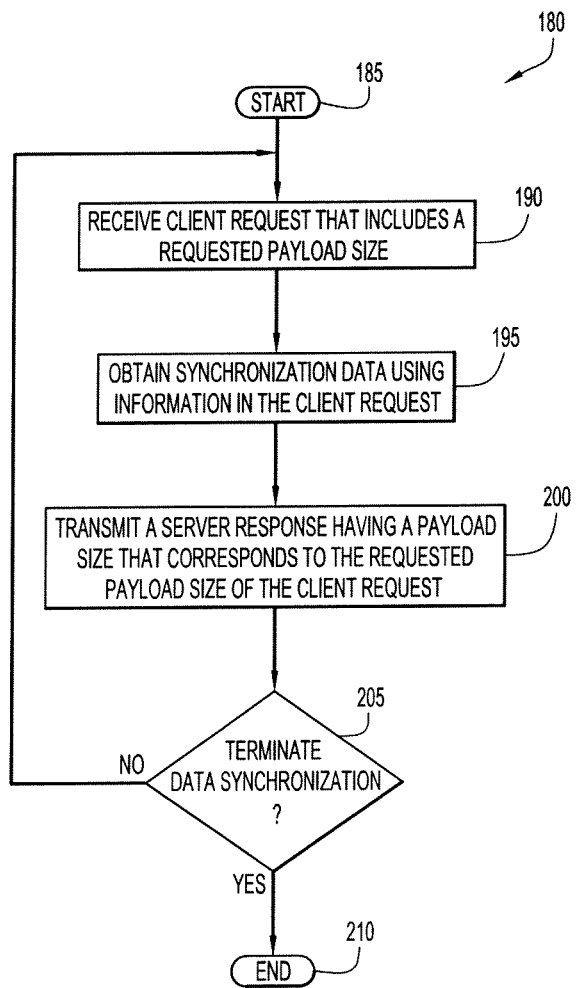
FIG. 2 is a flowchart of a data synchronization method according to techniques described herein.

FIG. 2 is a flowchart illustrating a data synchronization method 180 in accordance with embodiments presented herein. For ease of illustration, the method 180 of FIG. 2 will be described with reference to FIG. 1, namely the synchronization of data stored locally by client 140 with data from data repository 150 of server 110.

Method 180 begins at 185 and, at 190, the server 110 receives a data synchronization request, sometimes referred to herein as a client request, from the client 140. The client request indicates that the server 110 should initiate operations to transmit data in the data repository 150 to the client 140. As described further below, the client request includes, among other information, a "requested payload size." The requested payload is an indication of the size of the payload the client 140 expects in a response transmitted by the server 110.

Next, at 195 the server 110 uses information in the data client request to obtain synchronization data (i.e., data for transmission to the client 140) from the data repository 150. At 200, the server 100 transmits a data synchronization response, sometimes referred to herein as a server response, to the client 140. The server response comprises a payload and a header (or footer). The payload includes the synchronization data and has a size that corresponds to the requested payload size of the data synchronization request. That is, the size of the payload is the same size as, or smaller than, the requested payload size identified in the client request.

After the server response is transmitted to the client 140, a determination is made at 205 as to whether the data synchronization operations should be terminated (at least for a predetermined period of time). If the data synchronization should not be terminated, method 180 returns to 190 where the server 110 awaits another client request. The operations of 190, 195, 200, and 205 continue until it is determined at 200 that the data synchronization operations should be terminated. At that time, the method 180 ends at 210.

Figure 3:
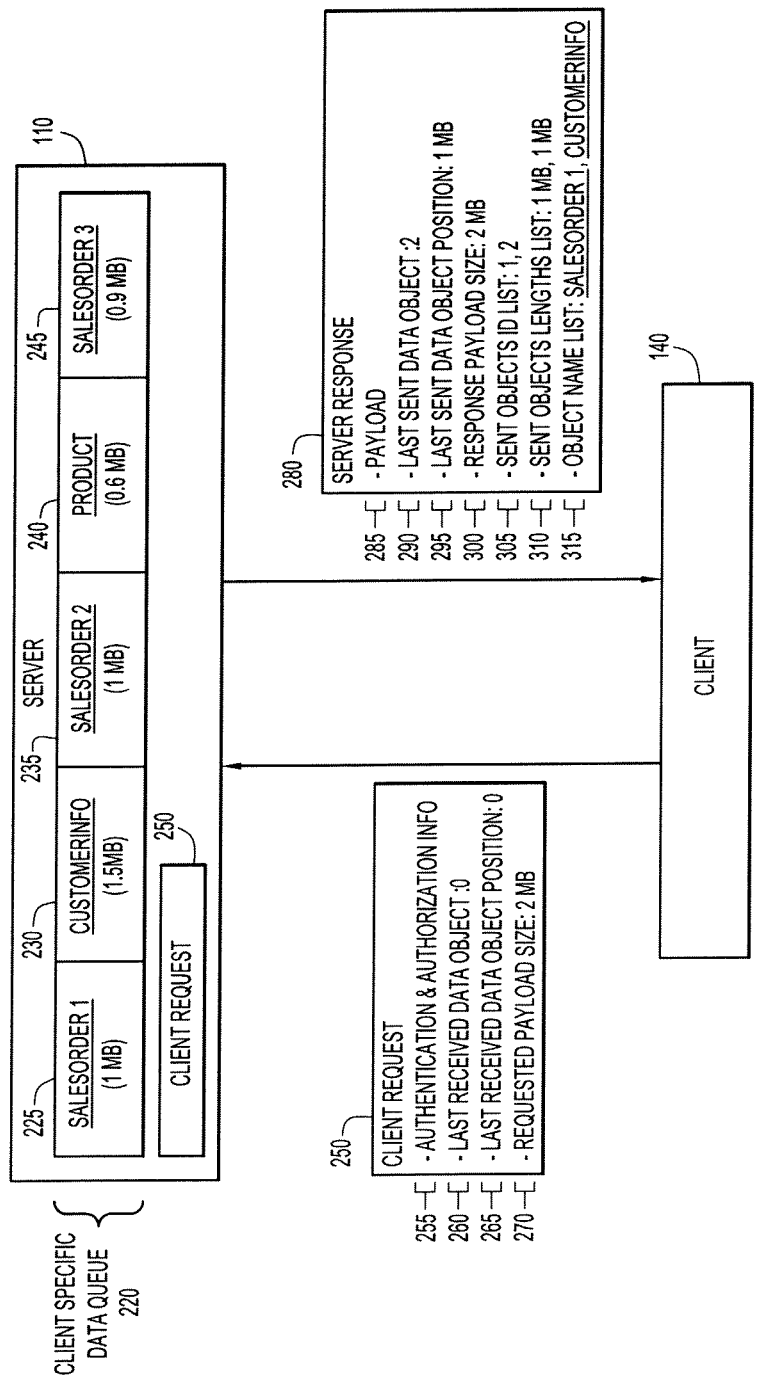
FIGS. 3-5 are schematic diagrams illustrating a hypothetical set of exchanges between a client and a backend system during data synchronization in accordance with techniques described herein.
Figure 4:
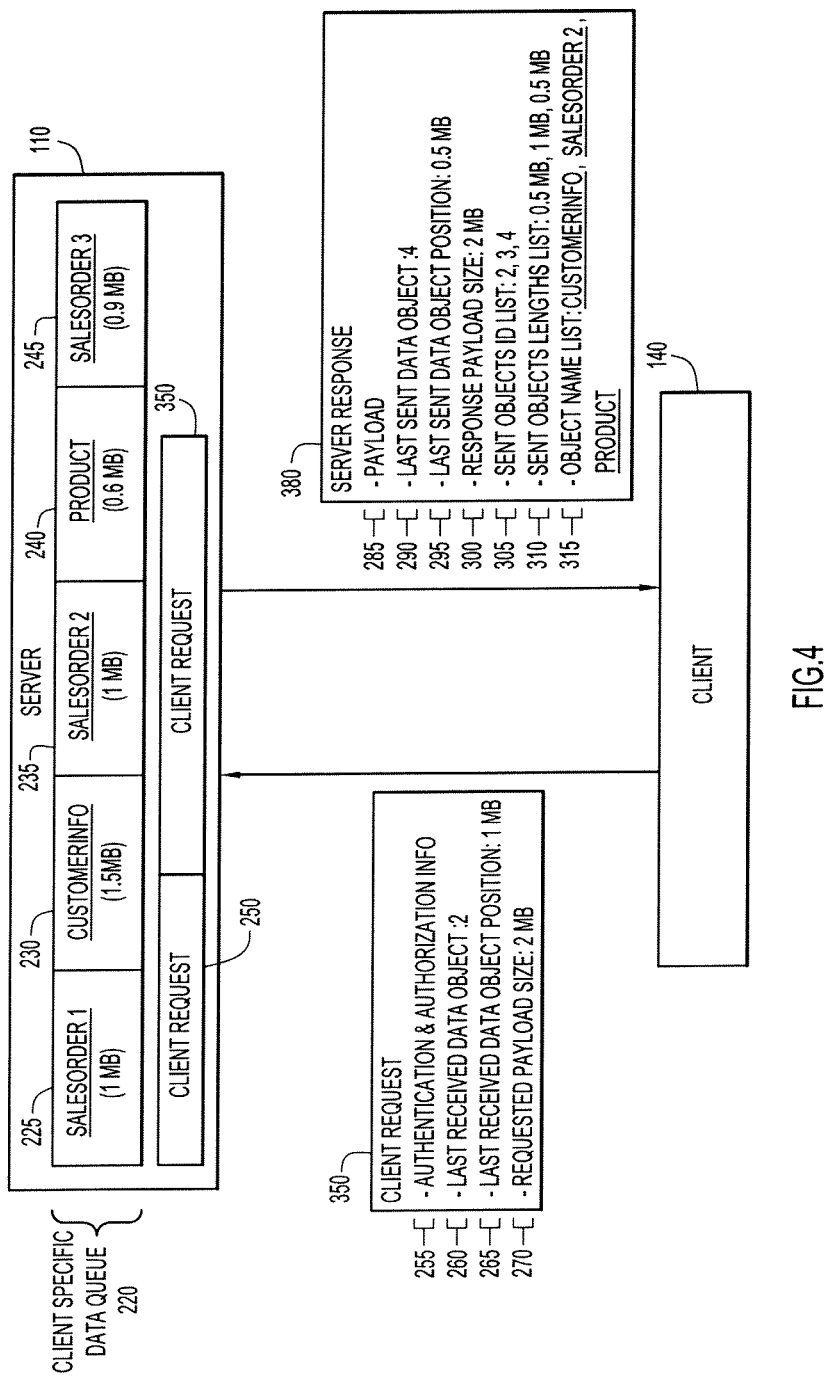
Figure 5:
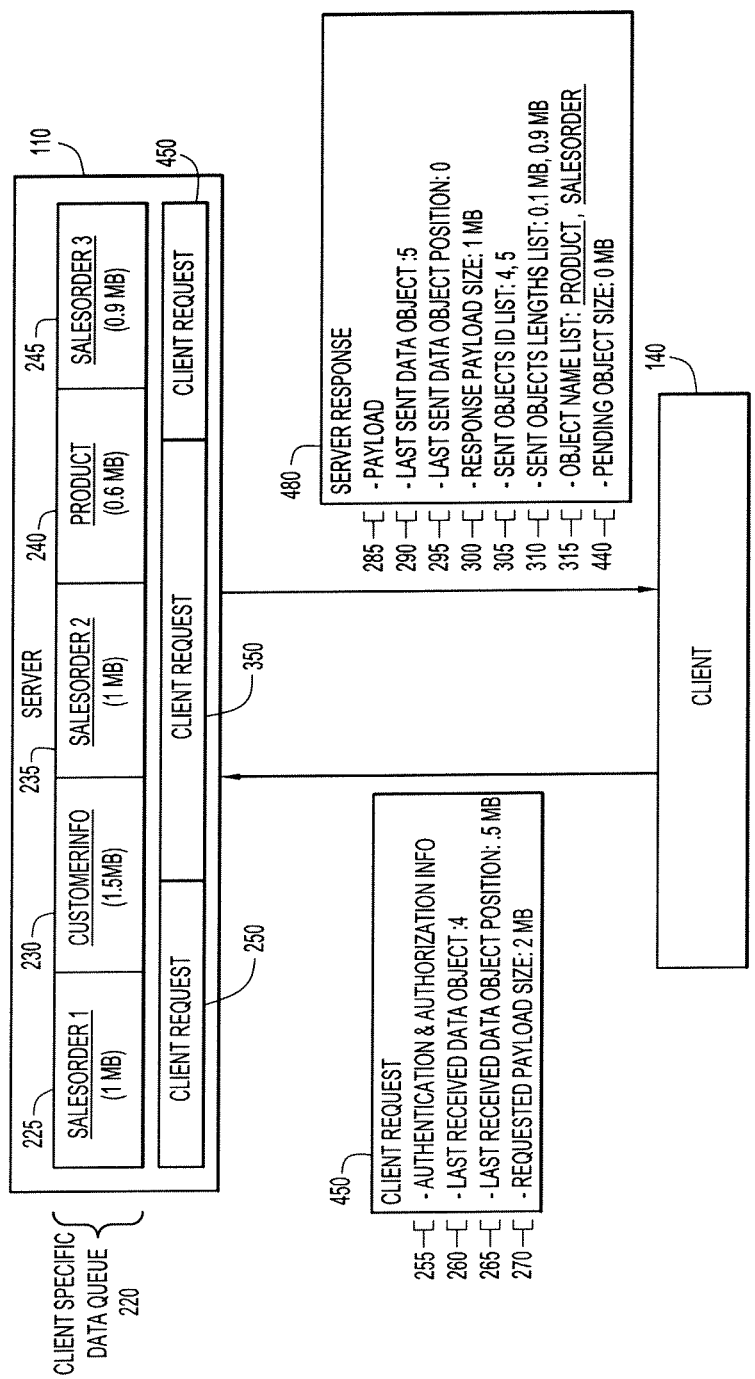

FIGS. 3-5 are schematic diagrams illustrating a hypothetical set of exchanges between a client (e.g., in/on/etc. a wireless device) and a server during data synchronization in accordance with embodiments presented herein. For ease of illustration, the embodiments of FIGS. 3-5 will be described with reference to FIG. 1, namely the synchronization of data stored locally by client 140 with data from data repository 150 of server 110.

As noted above, the client 140 is configured to locally store data in client device 130 for use while offline. To ensure proper operation, the locally stored data is synchronized with client-specific data in the data repository 150 of server 110. In the embodiments of FIGS. 3-5, the data repository 150 includes data for a plurality of clients, wherein the data for each client is stored sequentially in client-specific data queues. For example, FIG. 3 illustrates a client-specific data queue 220 associated with client 140. The client-specific data queue 220 comprises a plurality of data objects that may be used by client 140 during operation. The illustrative data objects of FIGS. 3-5 are data object 225 (SalesOrder 1) having a size of 1 megabyte (MB), data object 230 (CustomerInfo) having a size of 1.5 MBs, data object 235 (SalesOrder 2) having a size of 1 MB, data object 240 (Product) having a size of 0.6 MBs, and data object 245 (SalesOrder 3) having a size of 0.9 MBs. Each data object (data relevant for a particular entity) is assigned an identifier (ID) comprising a sequential natural number. In this case, the first data object 225 is assigned an ID of 1, the second data object 230 is assigned an ID of 2, the third data object 235 is assigned an ID of 3, the fourth data object 240 is assigned an ID of 4, and the fifth data object 245 is assigned an ID of 5.

It is to be appreciated that the number, names, sizes, etc. of data objects shown in FIGS. 3-5 are merely illustrative. Additionally, a data object herein may comprise, among other elements, any combination of one or more of inter alia audio recordings, video recordings, streaming audio and/or video, software applications, software application patches or updates, software application files (such as for example .DOC, .DOCX, .VSD, .ZIP, .TXT, .PDF, etc.), images, application data (such as for example queries, objects, responses, etc.), encoded and/or un-encoded text, etc.

As shown in FIG. 3, the data synchronization process starts when the client 140 transmits a data synchronization request (client request) 250 to the server 110. The client request 250 includes authentication and authorization information 255, an indication 260 of the last received data object, an indication 265 of the last received data object position, and an indication 270 of the requested payload size.

The indication 260 (last received data object) includes the identifier (ID) of the last data object for which data was successfully received by the client 140 from the server 110. This indication may be useful in circumstances where part of a payload is corrupted during transmission over the network and/or part of the payload is not received by the client 140. Upon receiving the indication of the last data object that was successfully received, the server 110 can re-send only the data that was not received by the client 140. In other words, this ensures that the entire payload is not sent again, but rather only data objects that are not received or are corrupted are re-sent. As shown in FIG. 3, the indication 260 has a value of zero since this is the beginning of the data synchronization process and no earlier data objects were received.

Each data object 225-245 has a size that corresponds to the number of bytes of data that form the respective data object. For example, if a data object has a size of 1 MB, then it includes 1024000 bytes of data. As described further below, during the data synchronization process, server 110 may send the client 140 a portion or segment of a data object (i.e., only a subset of the bytes that form the data object). The indication 265 (last received data object position) indicates the last received "byte position" of the last received data object. In other words, the indication 265 identifies the last byte of data of the last data object that was received by the client 140. In the case that the last data object was fully received, the indication 265 has a value of zero. As shown in FIG. 3, the indication 265 has a value of zero since this is the beginning of the data synchronization process and no earlier data objects were received.

The indication 270 (requested payload size) identifies the size of the payload that the client 140 expects to receive in a response transmitted by the server 110. In the example of FIG. 3, the indication 270 identifies a requested payload size of 2 MBs.

After receiving the client request 250, the server 110 uses the information in the client request to access the client-specific data queue 220 and obtain data for transmission to the client 140. More specifically, the client request 250 identifies a requested payload size 270 for a server response (2 MBs), an indication 260 of the last received data object (value 0), and an indication 265 of the last received data object position (value 0). As such, the server 110 retrieves 2 MBs of synchronization data from the client-specific data queue 220, starting at byte position 0 of the first data object (data object 225).

After obtaining the synchronization data, the server 110 generates a server response (data synchronization response) 280 for transmission to the client 140. The server response 280 comprises a payload 285 that includes the synchronization data obtained from the client-specific data queue 220 and additional information included in, for example, a message header or footer. This additional information includes an indication 290 of the last sent data object, an indication 295 of the last sent data object position, an indication 300 of the size of the payload 285, a sent objects ID list 305, a sent objects lengths list 310, and an object name list 315.

The indication 290 (last sent data object) is an identifier of the last data object in the server response. More specifically, as shown in FIG. 3, the client request 250 indicated that a subsequent response is to include 2 MBs of synchronization data. The first data object 225 in client-specific data queue 220 has a size of 1 MB, while the second data object 230 has a size of 1.5 MBs. As such, a payload of 2 MBs will span both all of first data object 225 and part of the second data object 230. Accordingly, the last sent data object in server response 280 is the second data object 230, and the indication 290 has a value of 2.

As noted above, the requested payload size of 2 MBs results in a payload that includes only a portion of the second data object 230. The indication 295 (last sent data object position) identifies the "byte position" of the last data object. In other words, the indication 295 identifies the last byte of data of the last data object that is included in the payload 285. As shown in FIG. 3, the indication 295 has a value representing a byte position of 1 MB, indicating that only the first 1 MB of the total 1.5 MBs in data object 230 have been included in the payload 285.

It is to be appreciated that the indication 295 is useful in cases where a partial data object is included in the payload 285. If the last data object included in a payload is complete, then the indication 295 has a value of zero.

The indication 300 (response payload size) identifies the size of the payload 285. In embodiments presented herein, the payload 285 has a size that is less than or equal to the requested payload size 270 of client request 250.

As noted, the server response 280 also includes a sent objects ID list 305. This sent objects ID list 305 is a list of the IDs for the data objects appended together in payload 285. The list 305 lists the IDs for the data objects in the same order in which they appear in the payload 285. In the embodiments of FIG. 3, the list 305 includes the value 1 followed by the value 2, referring to the first and second data objects (data objects 225 and 230, respectively).

The list 310 (sent object lengths) identifies the boundaries of each data object in the payload 285. The client 140 uses theses value to reconstruct individual data objects from the payload 285. In the embodiments of FIG. 3, the list 310 includes a first value representing a size of 1 MB followed by a second value representing a size of 1 MB. This indicates to the client that the first data object 225 comprises the first 1 MB of the payload 285 and that the second data object 230 comprises the second 1 MB of the payload 285.

The list 315 (object names list) provides the names for the data objects included in the payload 285. Again, the order of the names in the list 315 corresponds to the order in which the associated data objects appear in the payload 285. This list enables the client 140 to uniquely identify the included data objects and to determine where the data object data should be stored locally. In FIG. 3, the list 315 includes the names "SalesOrder 1" and "CustomerInfo."

In the embodiments of FIGS. 3-5, a determination is made after the client 140 receives a server response as to whether data synchronization should continue. As described further below, this determination may be made, for example, based on, information (or the lack of information) in the server response 280.

In alternative embodiments, the determination of whether the data synchronization process is completed may be made by the server 110 prior to transmitting the server response 280. In such embodiments, the server response 280 includes a "trigger" that causes the client to transmit (or not transmit) another client request 250.

If the synchronization process should continue, a new client request generated by the client 140 will initiate the transfer of additional synchronization data from the server 110 to the client 140. FIG. 4 illustrates the transmission of a new client request 350 following receipt of server response 280 of FIG. 3.

Similar to the client request 250 of FIG. 3, the client request 350 includes authentication and authorization information 255, an indication 260 of the last received data object, and indication 265 of the last received data object position, and an indication 270 of the response size, sometimes referred to herein as the requested payload size.

As shown in FIG. 4, the indication 260 (last received data object) of client request 350 has a value of 2 (i.e., the identifier of the second data object 230 in client-specific data queue 220). This indicates to the server 110 that the data from data object 230 was the last data that was successfully received by the client 140.

The indication 265 (last received data object position) has a value representing a byte position of 1 MB (i.e., the last received byte position of the last received data object 230 is 1 MB). This indicates to the server 110 that client 140 received the first 1 MB of data in data object 230.

The indication 270 of client request 350 identifies the size of the payload that the client 140 expects to receive in a response transmitted by the server 110. In the example of FIG. 4, the indication 270 identifies the requested payload size as 2 MBs.

After receiving the client request 350, the server 110 uses the information in the client request to access the client-specific data queue 220 and obtain data for transmission to the client 140. More specifically, the client request 350 identifies a requested payload size 270 for a server response (2 MBs), an indication 260 of the last received data object (value 2, indicating data object 230), and an indication 265 of the last received data object position (value representing 1 MB). As such, the server 110 retrieves 2 MBs of synchronization data from the client-specific data queue 220, starting at the 1 MB byte position of the second data object (data object 230).

After obtaining the synchronization data, the server 110 generates a server response 380 for transmission to the client 140. Similar to the server response 280 of FIG. 3, server response 380 comprises a payload 285 that includes the synchronization data obtained from the client-specific data queue and additional information included in, for example, a message header or footer. This additional information in server response 380 comprises an indication 290 of the last sent data object, an indication 295 of the last sent data object position, an indication 300 of the size of the payload 285, a sent objects ID list 305, a sent objects lengths list 310, and an object name list 315.

As noted above, the indication 290 (last sent data object) is an identifier of the last data object in the server response 380. More specifically, as shown in FIG. 4, the client request 350 indicated that a subsequent response is to include 2 MBs of synchronization data, starting at 1 MB of the second data object 230. The second data object 230 in client-specific data queue 220 has a size of 1.5 MB, the third data object 235 has a size of 1 MB, and the fourth data object 240 has a size of 0.6 MBs. As such, a payload of 2 MBs starting at 1 MB of the second data object 230 will span the remainder of the second data object 230 (0.5 MBs), the third data object 235 (1 MB), and part of the fourth data object 240 (0.5 MBs). Accordingly, the last sent data object in server response 380 is the fourth data object 240, and the indication 290 has a value of 4.

As noted above, the indication 295 (last sent data object position) identifies the last byte of data of the last data object that is included in the payload 285. The requested payload size of 2 MBs results in a payload that includes only a portion of the fourth data object 240. As such, the indication 295 of server response 380 has a value representing 0.5 MBs, indicating that the first 0.5 MBs of the total 0.6 MBs in data object 240 have been included in the payload 285.

Also as noted above, the indication 300 (response payload size) identifies the size of the payload 285. In FIG. 4, the payload size is 2 MBs (i.e., equal to the requested payload size 270 of client request 350).

The sent objects ID list 305 of server response 380 is a list of the IDs for the data objects appended together in payload 285. The list 305 lists the IDs for the data objects in the same order in which they appear in the payload 285. In the embodiment of FIG. 4, the list 305 includes (in order) the values 2, 3, and 4, referring to the second, third, and fourth data objects (data objects 230, 235, and 240, respectively).

The list 310 (sent object lengths) identifies the boundaries of each data object in the payload 285. The client 140 uses theses value to reconstruct individual data objects from the payload 285. In the embodiment of FIG. 4, the list 310 includes (in order) a first value representing 0.5 MBs, a second value representing 1 MB, and a third value representing 0.5 MBs. This list 310 indicates to the client that the second data object 230 comprises the first 0.5 MBs of the payload 285, that the third data object 235 comprises the next 1 MB of the payload 285, and that the fourth data object 240 includes the last 0.5 MBs of the payload 285.

The list 315 (object names list) provides the names for the data objects included in the payload 285 so that the client 140 can uniquely identify the included data objects and determine where the data object data should be stored locally. In the embodiment of FIG. 4, list 315 comprises the names "CustomerInfo" (corresponding to data object 230), "SalesOrder 2" (corresponding to data object 235), and "Product" (corresponding to data object 240).

As noted, in the embodiments of FIGS. 3-5, a determination is made after the client 140 receives a server response as to whether data synchronization should continue. If all synchronization data should continue, then a new client request is generated by the client 140. FIG. 5 illustrates the transmission of a new client request 450.

Similar to the client request 250 of FIG. 3, the client request 450 includes authentication and authorization information 255, an indication 260 of the last received data object, and indication 265 of the last received data object position, and an indication 270 of the response size, sometimes referred to herein as the requested payload size.

As shown in FIG. 5, the indication 260 (last received data object) of client request 450 has a value of 4 (i.e., the identifier of the fourth data object 240 in client-specific data queue 220). This indicates to the server 110 that the data from data object 240 was the last data that was successfully received by the client 140.

The indication 265 (last received data object position) has a value representing 0.5 MBs (i.e., the last received byte position of the last received data object 240 is 0.5 MBs). This indicates to the server 110 that client 140 received the first 0.5 MBs of data in data object 240.

The indication 270 of client request 450 identifies the size of the payload that the client 140 expects to receive in a response transmitted by the server 110. In the example of FIG. 5, the indication 270 identifies the requested payload size as 2 MBs.

After receiving the client request 450, the server 110 uses the information in the client request to access the client-specific data queue 220 and obtain data for transmission to the client 140. More specifically, the client request 450 identifies a requested payload size 270 for a server response (2 MBs), an indication 260 of the last received data object (value 4, indicating data object 240), and an indication 265 of the last received data object position (value representing 0.5 MB). As such, the server 110 attempts to retrieve 2 MBs of synchronization data from the client-specific data queue 220, starting at the 0.5 MB byte position of the fourth data object (data object 230).

In the example of FIG. 5, the client-specific data queue 220 includes only 1 MB of data subsequent to byte position 0.5 of data object 240. As such, the server 110 can only obtain the remaining 1 MBs of synchronization data.

After obtaining the synchronization data, the server 110 generates a server response 480 for transmission to the client 140. Similar to the server response 280 of FIG. 3, server response 480 includes a payload 285 that includes the synchronization data obtained from the client-specific data queue and additional information included in, for example, a message header or footer. This additional information in server response 480 comprises an indication 290 of the last sent data object, an indication 295 of the last sent data object position, an indication 300 of the size of the payload 285, a sent objects ID list 305, a sent objects lengths list 310, and an object name list 315. This additional information also includes an indication 440 of the pending data object size.

As noted above, the indication 290 (last sent data object) is an identifier of the last data object in the server response 480. More specifically, as shown in FIG. 5, the client request 450 indicated that a subsequent response is to include 2 MBs of synchronization data, starting at 0.5 MBs of the fourth data object 240. The fourth data object 240 in the client-specific data queue 220 has a size of 0.6 MBs, while the fifth data object has a size of 0.9 MBs. As such, only 1 MB remains in the client-specific data queue 220, leading to a payload size of 1 MB. This payload starts at 0.5 MBs of the fourth data object 240 and will span the remainder of the fourth data object 240 (0.1 MBs) and the fifth data object 245 (0.9 MBs). Accordingly, the last sent data object in server response 380 is the fifth data object 245, and the indication 290 has a value of 5.

As noted above, the indication 295 (last sent data object position) identifies the last byte of data of the last data object that is included in the payload 285. The requested payload size of 2 MBs results in a payload that includes the entirety of the fifth (and last) data object 245. As such, the indication 295 of server response 480 has a value of 0, indicating that the entire fifth data object 245 has been included in the payload 285.

Also as noted above, the indication 300 (response payload size) identifies the size of the payload 285. In FIG. 5, the payload size is 1 MBs, which is less than the requested payload size 270 of client request 450.

The sent objects ID list 305 of server response 380 is a list of the IDs for the data objects appended together in payload 285. In the embodiments of FIG. 5, the list 305 includes (in order) the values 4 and 5, referring to the fourth and fifth data objects (data objects 240 and 245, respectively).

The list 310 (sent object lengths) identifies the boundaries of each data object in the payload 285. The client 140 uses these values to reconstruct individual data objects from the payload 285. In the embodiments of FIG. 5, the list 310 includes (in order) a first value representing 0.1 MBs and a second value representing 0.9 MBs. This list 310 indicates to the client 140 that the fourth data object 240 comprises the first 0.1 MBs of the payload 285 and that the fifth data object 245 comprises the last 0.9 MBs of the payload 285.

The list 315 (object names list) provides the names for the data objects included in the payload 285 so that the client 140 can uniquely identify the included data objects and determine where the data object data should be stored locally. In the embodiments of FIG. 5, list 315 comprises the names "Product" (corresponding to data object 240) and "SalesOrder 3" (corresponding to data object 245).

As noted, a determination is made after the client 140 receives a server response as to whether data synchronization should continue. This determination may be made, for example, based on indication 440 of the pending object size. This indication 440 is used to inform the client 140 that no additional synchronization data remains in the client-specific data queue 220 and, accordingly, that the data synchronization process may be terminated (at least for some predetermined period of time).

In alternative embodiments, the determination may be made by the server 110 prior to transmitting the server response 280. In such embodiments, the indication 440 operates as a "trigger" that causes the client to cease transmission of client requests. In such embodiments, the client 140 is configured to transmit a new client request following receipt of a server response that does not include indication 440.

As noted above, FIGS. 3-5 illustrate a hypothetical set of exchanges during a data synchronization process. Shown below is pseudo-code corresponding to the exchanges of FIGS. 3-5.

```
Requesting data from server:
GET http://bcemain.wdf.sap.corp:50009/sap/bc/doesync
Request Headers:
Authorization: <username:password>
X-SAP-LAST_RECEIVED_SERVER_OBJ: 0
X-SAP-LAST_RECEIVED_SERVER_OBJ_POS: 0
X-SAP-REQUEST_OBJ_SIZE: 2097152
Response 200 OK
Response Headers:
X-SAP-LAST_SENT_SERVER_OBJ_ID: 2
X-SAP-LAST_SENT_SERVER_OBJ_POS: 524288
X-SAP-RESPONSE_OBJ_SIZE: 2097152
X-SAP-SENDING_OBJ_ID_LIST: 1,2
X-SAP-SENDING_OBJ_LENGTHS: 1572864,524288
X-SAP-ENTITY_LIST: SalesOrder,Customer
Response Body:
<xml containing Object 1, entity SalesOrder, total size 1572864>
<partial xml containing Object 2, entity Customer,
partial size 524288>
Start of processing response:
Processing Object 1 - SalesOrder
Object offset: [0, 1572864]
Object size: 1572864
Object 1 completely processed: total size: 1572864
Processing Object 2 (partial) - Customer
Object offset: [1572864, 524288]
Object size: 524288
End of processing response.
Requesting data from server:
GET http://bcemain.wdf.sap.corp:50009/sap/bc/doesync
Request Headers:
Authorization: <username:password>
X-SAP-LAST_RECEIVED_SERVER_OBJ: 2
X-SAP-LAST_RECEIVED_SERVER_OBJ_POS: 524288
X-SAP-REQUEST_OBJ_SIZE: 2097152
Response 200 OK
Response Headers:
X-SAP-LAST_SENT_SERVER_OBJ_ID: 3
X-SAP-LAST_SENT_SERVER_OBJ_POS: 1048576
X-SAP-RESPONSE_OBJ_SIZE: 2097152
X-SAP-SENDING_OBJ_ID_LIST: 2,3
X-SAP-SENDING_OBJ_LENGTHS: 1048576,1048576
X-SAP-ENTITY_LIST: Customer,SalesOrder
Response Body:
<partial xml containing Object 2, entity Customer,
partial size 1048576>
<partial xml containing Object 3, entity SalesOrder,
partial size 1048576>
Start of processing response:
Processing Object 2 (partial)- Customer
Object offset: [0, 1048576]
Object size: 1048576
Object 2 completely processed: total size: 1572864
Processing Object 3 (partial) - SalesOrder
Object offset: [1048576, 1048576]
Object size: 1048576
End of processing response.
Requesting data from server:
GET http://bcemain.wdf.sap.corp:50009/sap/bc/doesync
Request Headers:
Authorization: <username:password>
X-SAP-LAST_RECEIVED_SERVER_OBJ: 3
X-SAP-LAST_RECEIVED_SERVER_OBJ_POS: 1048576
X-SAP-REQUEST_OBJ_SIZE: 2097152
Response 200 OK
Response Headers:
X-SAP-LAST_SENT_SERVER_OBJ_ID: 4
X-SAP-LAST_SENT_SERVER_OBJ_POS: 0
X-SAP-RESPONSE_OBJ_SIZE: 2097152
X-SAP-SENDING_OBJ_ID_LIST: 3,4
X-SAP-SENDING_OBJ_LENGTHS: 524288,1572864
X-SAP-ENTITY_LIST: SalesOrder,Product
Response Body:
<partial xml containing Object 3, entity SalesOrder,
partial size 524288>
<xml containing Object 4, entity Product, size 1572864>
Start of processing response:
Processing Object 3 (partial)- SalesOrder
Object offset: [0, 524288]
Object size: 524288
Object 3 completely processed: total size: 1572864
Processing Object 4 - Product
Object offset: [524288, 1572864]
Object size: 1572864
Object 4 completely processed: total size: 1572864
End of processing response.
```

Certain embodiments presented herein have built in support for handling partial data objects (i.e. behavior does not change depending on the object size). Additionally, it may be possible to recover/resend a particular object till such a time it is present on the server. Furthermore, certain embodiments presented herein may be used irrespective of the data/encoding format of the data objects, provide efficient use of network bandwidth, optimum use of server resources, provide a synchronization interface in accordance with Representational State Transfer (REST) (i.e., RESTful synchronization) to enable connectivity from any client platform, and are resilient to errors during network transfer (esp. when very large objects are synchronized).

It is to be appreciated that the values used for the various ID, indications, lists, etc. of FIGS. 3-5, and the above pseudo-code, are merely illustrative. For example, the indicators (e.g., 'Last Sent Data Object,' 'Sending Object ID List,' etc.) and depicted in the pseudo-code 4 (e.g., 'X-SAP-LAST_SENT_SERVER_OBJ_ID,' 'X-SAP-SENDING_OBJ_ID_LIST,' X-SAP-LAST_RECEIVED_SERVER_OBJ, X-SAP-REQUEST_OBJ_SIZE, X-SAP-RESPONSE_OBJ_SIZE, etc.) are illustrative only it will be readily apparent to one of ordinary skill in the relevant art that numerous other headers, header naming conventions, header combinations or arrangements, etc. are easily possible. Additionally, the specific data objects noted above (in connection with FIGS. 3-5) and the specific 'Response Body' elements depicted in the pseudo-code are illustrative only and it will be readily apparent to one of ordinary skill in the relevant art that numerous naming schemes, ordering approaches, encoding paradigms, etc. are easily possible.

Furthermore, the authentication and authorization information noted above (in connection with FIGS. 3-5) and the specific 'Authorization: <username:password>' elements depicted in the pseudo-code are illustrative only and it will be readily apparent to one of ordinary skill in the relevant art that numerous approaches (involving for example and inter alia user names and passwords, one-time tokens, time-sensitive credentials, support for Single Sign-On (SSO), etc.), encoding paradigms, etc. are easily possible.

The narrative that was presented above was illustrative only and it will be readily apparent to one of ordinary skill in the relevant art that numerous other components, interactions, interaction arrangements, etc. are easily possible. For example and possibly inter alia:

While the exchanges that are depicted in the above pseudo-code carry a HyperText Transfer Protocol (HTTP) flavor, it will be readily apparent to one of ordinary skill in the relevant art that numerous alternatives are easily possible. For example, any combination of one or more of inter alia a (Short Object Service (SMS), Multimedia Object Service (MMS), Internet Protocol (IP) Multimedia Subsystem (IMS), etc.) object exchange, a Wireless Application Protocol (WAP) exchange, a structured or an unstructured data transfer, a data transfer operation atop one or more proprietary and/or standards-based protocols, an Electronic Object (E-Mail) exchange, an Instant Messaging (IM) exchange, Wi-Fi, a Near Field Communication (NFC) exchange, etc.

Several of the request, response, etc. exchanges that were described above may employ among other things different addressing artifacts such as inter alia telephone numbers, short codes, Internet Protocol (IP) addresses, E-Mail address, Instant Messaging (IM) handles, Session Initiation Protocol (SIP) addresses, etc.

Several of the request, response, etc. exchanges that were described above may optionally contain any combination of one or more of information elements (such as for example a relevant or applicable factoid, a piece of product information, etc.), advertisements, promotional items, coupons, vouchers, surveys, questionnaires, gift cards, retailer credits, etc. Such material may be selected statically or randomly (from for example a repository of defined material), may be location-based (for example, selected from a pool of available material based on possibly inter alia information about the current physical location of a Customer's wireless device), may be application-specific, etc.

Several of the request, response, etc. exchanges that were described above may optionally leverage, reference, etc. information on the current physical location of a user's wireless device as obtained through inter alia a one or more of a Location-Based Service (LBS) facility, a Global Positioning System (GPS) facility, etc. to among other things enhance security; provide more applicable, appropriate, efficient, etc. information delivery, etc.

Figure 6:
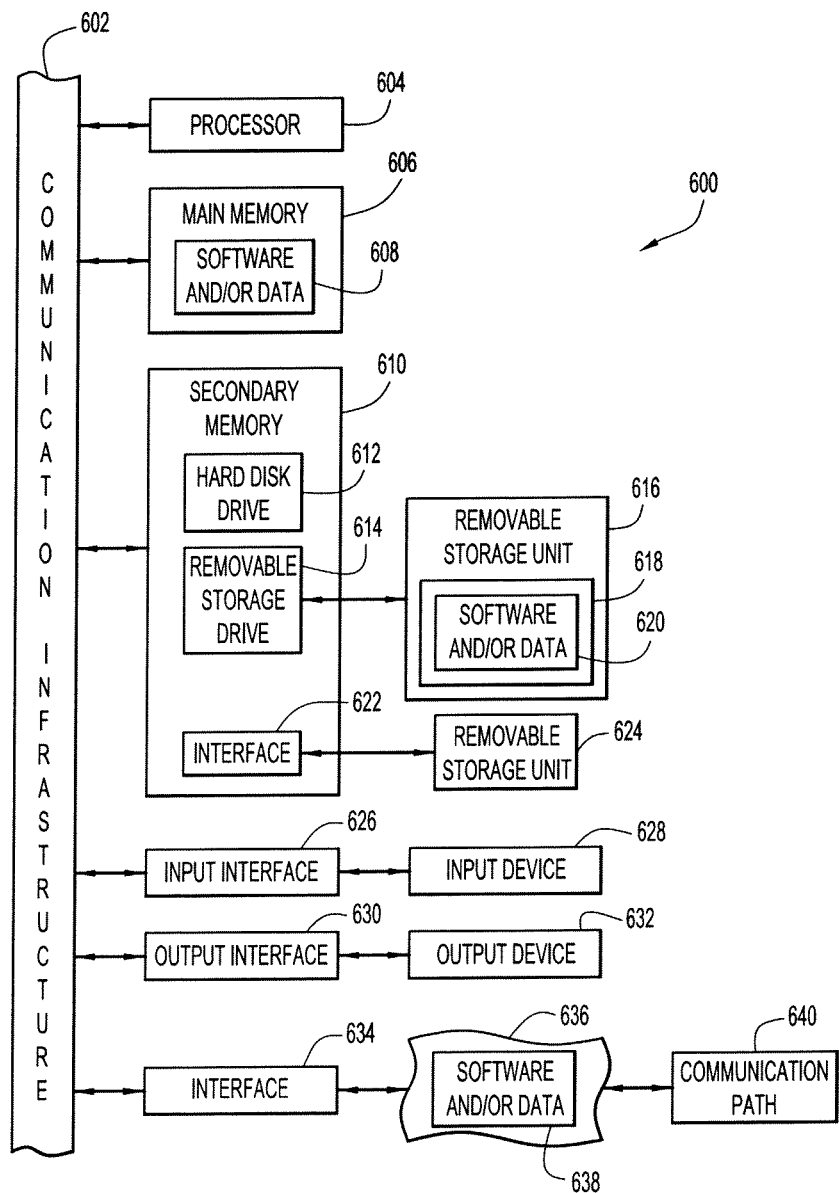
FIG. 6 shows an example block diagram of a computing device capable of data synchronization according to the techniques described herein.

FIG. 6 illustrates an example computer system 600 in which aspects of the above disclosure, or portions thereof, may be implemented as possibly inter alia computer-readable code. Computer system 600 may be (or may be part of) a server (e.g., server 110) or other electronic device or appliance configured to operate in accordance with the functionality described herein.

Computer system 600 includes one or more processors, such as processor 604. Processor 604 can be a special purpose processor or a general purpose processor. Processor 604 is connected to a communication infrastructure 602 (for example, a bus or a network).

Computer system 600 also includes a main memory 606, preferably Random Access Memory (RAM), containing possibly inter alia computer software and/or data 608.

Computer system 600 may also include a secondary memory 610. Secondary memory 610 may include, for example, a hard disk drive 612, a removable storage drive 614, a memory stick, etc. A removable storage drive 614 may comprise a floppy disk drive, a magnetic tape drive, an optical disk drive, a flash memory, or the like. A removable storage drive 614 reads from and/or writes to a removable storage unit 616 in a well known manner. A removable storage unit 616 may comprise a floppy disk, magnetic tape, optical disk, etc. which is read by and written to by removable storage drive 614. As will be appreciated by persons skilled in the relevant art(s) removable storage unit 616 includes a computer usable storage medium 618 having stored therein possibly inter alia computer software and/or data 620.

In alternative implementations, secondary memory 610 may include other similar means for allowing computer programs or other instructions to be loaded into computer system 600. Such means may include, for example, a removable storage unit 624 and an interface 622. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 624 and interfaces 622 which allow software and data to be transferred from the removable storage unit 624 to computer system 600.

Computer system 600 may also include an input interface 626 and a range of input devices 628 such as, possibly inter alia, a keyboard, a mouse, etc.

Computer system 600 may also include an output interface 630 and a range of output devices 632 such as, possibly inter alia, a display, one or more speakers, etc.

Computer system 600 may also include a communications interface 634. Communications interface 634 allows software and/or data 638 to be transferred between computer system 600 and external devices. Communications interface 634 may include a modem, a network interface (such as an Ethernet card), a communications port, a Personal Computer Memory Card International Association (PCMCIA) slot and card, or the like. Software and/or data 638 transferred via communications interface 634 are in the form of signals 636 which may be electronic, electromagnetic, optical, or other signals capable of being received by communications interface 634. These signals 636 are provided to communications interface 634 via a communications path 640. Communications path 640 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 616, removable storage unit 624, and a hard disk installed in hard disk drive 612. Signals carried over communications path 640 can also embody the logic described herein. Computer program medium and computer usable medium can also refer to memories, such as main memory 606 and secondary memory 610, which can be memory semiconductors (e.g. Dynamic Random Access Memory (DRAM) elements, etc.). These computer program products are means for providing software to computer system 600.

Computer programs (also called computer control logic) are stored in main memory 606 and/or secondary memory 610. Computer programs may also be received via communications interface 634. Such computer programs, when executed, enable computer system 600 to implement the techniques discussed herein. In particular, the computer programs, when executed, enable processor 604 to implement, e.g., the functions of supplemental information delivery logic 134. Accordingly, such computer programs represent controllers of the computer system 600. Where the techniques are implemented using software, the software may be stored in a computer program product and loaded into computer system 600 using removable storage drive 614, interface 622, hard drive 612 or communications interface 634.

The techniques described herein are also directed to computer program products comprising software stored on any computer usable medium. Such software, when executed in one or more data processing devices, causes data processing device(s) to operate as described herein. Embodiments may employ any computer usable or readable medium, known now or in the future. Examples of computer usable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

The above description is intended by way of example only. Various modifications and structural changes may be made therein without departing from the scope of the concepts described herein and within the scope and range of equivalents of the claims.

What is claimed is:

1. A data synchronization method, comprising:
  receiving, from a client, a request for synchronization data, wherein the request specifies a requested payload size, identifies a last received data object by specifying a corresponding unique identifier for such last received data object and identifies a last received data object position;
  based on information in the client request, obtaining synchronization data from a data repository; and
  transmitting a response to the client that includes a payload of synchronization data, the transmitting the response to the client further comprising transmitting a response that specifies the payload size, and comprises a sending objects identifier (ID) list and a sending objects length list,
  wherein the size of the payload is less than or equal to the requested payload size, the sending objects ID list is a list of the identifiers for all data objects appended together as part of the payload of synchronization data, the sending objects ID list lists the data objects in a same order in which they appear in the payload, and the sending objects length list identifies boundaries of each data object in the payload to allow the client to reconstruct the individual data objects from the payload.

2. The method of claim 1, wherein obtaining synchronization data from a data repository comprises:
  obtaining data from a client-specific data queue comprising a plurality of sequential data objects beginning at the last received data object position in the last received data object identified in the request.

3. The method of claim 1, wherein transmitting the response to the client further comprises:
  transmitting a response that identifies the last sent data object and the last sent data object position.

4. The method of claim 3, wherein transmitting the response to the client further comprises:
  transmitting a response that comprises an object name list.

5. The method of claim 3, further comprising:
  transmitting a response that specifies a pending object size.

6. The method of claim 1, further comprising:
  determining if the request provides the client with a selected amount of synchronization data.

7. An apparatus, comprising:
  a memory operable to store logic instructions and a plurality of data objects, each data object having a different identifier;
  a network interface operable to communicate with an electronic network; and
  a processor, wherein the memory, network interface and processor are communicatively coupled to each other and wherein the logic instructions, when executed by the processor, are operable to:
    receive, from a client, a request for synchronization data, wherein the request indicates a requested payload size, an identifier of a last received data object and a last received data object position,
    based on information in the client request, obtain synchronization data from a data repository, and
    transmit a response to the client that includes a payload of synchronization data, wherein to transmit the response to the client, the processor is configured to transmit a response that specifies the payload size, and comprises a sending objects identifier (ID) list and a sending objects length list, and
    wherein the size of the payload is less than or equal to the requested payload size, the sending objects ID list is a list of the identifiers for all data objects appended together as part of the payload of synchronization data, the sending objects ID list lists the data objects in a same order in which they appear in the payload, and the sending objects length list identifies boundaries of each data object in the payload to allow the client to reconstruct the individual data objects from the payload.

8. The apparatus of claim 7, wherein to obtain synchronization data from a data repository, the processor is configured to:
  obtain data from a client-specific data queue comprising a plurality of sequential data objects beginning at the last received data object position in the last data received object identified in the request.

9. The apparatus of claim 7, wherein to transmit the response to the client, the processor is configured to:
  transmit a response that identifies the last sent data object and the last sent data object position.

10. The apparatus of claim 9, wherein to transmit the response to the client, the processor is configured to:
  transmit a response that comprises an object name list.

11. The apparatus of claim 9, wherein the processor is further configured to:
  transmit a response that specifies a pending object size.

12. The apparatus of claim 7, wherein the processor is further configured to:
  determine if the request provides the client with a selected amount of synchronization data.

13. One or more non-transitory computer readable storage media encoded with software comprising computer executable instructions and when the software is executed operable to:
  receive, from a client, a request for synchronization data, wherein the request indicates a requested payload size, a unique identifier of a last received data object and a last received data object position,
  based on information in the client request, obtain synchronization data from a data repository; and
  transmit a response to the client that includes a payload of synchronization data, wherein the instructions operable to transmit the response to the client comprise instructions operable to transmit a response specifying the payload size, and comprising a sending objects identifier (ID) list and a sending objects length list, and wherein the size of the payload is less than or equal to the requested payload size, the sending objects ID list is a list of the identifiers for all data objects appended together as part of the payload of synchronization data, the sending objects ID list lists the data objects in a same order in which they appear in the payload, and the sending objects length list identifies boundaries of each data object in the payload to allow the client to reconstruct the individual data objects from the payload.

14. The non-transitory computer readable storage media of claim 13, wherein the instructions operable to obtain synchronization data from a data repository comprise instructions operable to:
  obtain data from a client-specific data queue comprising a plurality of sequential data objects beginning at the last received data object position in the last received data object identified in the request.

15. The non-transitory computer readable storage media of claim 13, wherein the instructions operable to transmit the response to the client comprise instructions operable to:
  transmit a response specifying the last sent data object, and the last sent data object position.

* * * * *